US009624708B2

(12) United States Patent
Balay et al.

(10) Patent No.: US 9,624,708 B2
(45) Date of Patent: Apr. 18, 2017

(54) CLOSURE WITH ROLLER ENDLOCK

(71) Applicant: CIW Enterprises, Inc., Mountaintop, PA (US)

(72) Inventors: Thomas Balay, Drums, PA (US); Joseph Balay, Sugarloaf, PA (US)

(73) Assignee: CIW Enterprises, Inc., Mountain Top, PA (US)

( * ) Notice: Subject to any disclaimer, the term of this patent is extended or adjusted under 35 U.S.C. 154(b) by 0 days.

(21) Appl. No.: 14/643,347

(22) Filed: Mar. 10, 2015

(65) Prior Publication Data

US 2016/0265260 A1    Sep. 15, 2016

(51) Int. Cl.
*E06B 9/08*   (2006.01)
*E05D 15/16*  (2006.01)
*F16C 29/04*  (2006.01)
*E05D 15/24*  (2006.01)

(52) U.S. Cl.
CPC .......... *E05D 15/165* (2013.01); *E05D 15/24* (2013.01); *F16C 29/04* (2013.01); *E05Y 2900/11* (2013.01)

(58) Field of Classification Search
CPC ....... E05D 15/165; E05D 15/18; E06B 9/581; E06B 9/171; E06B 9/18; A47H 15/02
USPC ............. 16/91, 97, 98, 102, 106, 107, 87 B; 160/133, 201, 118, 196.1, 200, 207, 208
See application file for complete search history.

(56) References Cited

U.S. PATENT DOCUMENTS

| | | | | |
|---|---|---|---|---|
| 1,381,191 | A * | 6/1921 | Higson | E05D 15/0691 384/58 |
| 1,426,170 | A * | 8/1922 | Frantz | E05D 15/12 16/104 |
| 1,920,855 | A * | 8/1933 | Gloekler | E06B 3/4663 16/87 B |
| 1,925,574 | A * | 9/1933 | Scott | E05D 15/246 16/97 |
| 1,954,987 | A * | 4/1934 | Clark | E05D 15/165 16/DIG. 31 |
| 2,171,194 | A * | 8/1939 | Smith | E05D 13/1261 16/104 |
| 2,196,903 | A * | 4/1940 | Rowe | E05D 15/165 16/104 |
| 2,239,273 | A * | 4/1941 | Rowe | E05D 15/165 16/94 R |
| 2,871,932 | A * | 2/1959 | Stroup | E05D 15/165 16/97 |
| 3,022,817 | A * | 2/1962 | Cafardi | E05D 15/24 160/113 |

(Continued)

FOREIGN PATENT DOCUMENTS

AT    0255038 A2 *  2/1988  ............... E06B 9/32
AU    WO 2012126068 A1 *  9/2012  ........... E05D 15/246

(Continued)

*Primary Examiner* — Katherine Mitchell
*Assistant Examiner* — Johnnie A Shablack
(74) *Attorney, Agent, or Firm* — Mitchell A. Smolow

(57) ABSTRACT

A closure is described. In a preferred embodiment a novel door roller is presented that is more resistant to a dislodgement force. The door roller comprises a bearing that rolls on a piece of round stock that is part of a door guide. When a dislodgement force is imposed on the door, the door bows and the bearing contacts the stock preventing dislodgement of the door roller from its track and allow the door to remain operational.

14 Claims, 4 Drawing Sheets

(56) References Cited

U.S. PATENT DOCUMENTS

| | | | | |
|---|---|---|---|---|
| RE25,310 E | * | 1/1963 | King | A47H 13/04 160/126 |
| 3,072,975 A | * | 1/1963 | Burmeister | E04B 2/827 105/155 |
| 3,100,316 A | * | 8/1963 | Boiu | E05D 15/0634 16/105 |
| 3,105,543 A | * | 10/1963 | Nolan | A47H 5/032 160/346 |
| 3,195,192 A | * | 7/1965 | Neisewander | E04B 2/827 160/40 |
| 3,253,552 A | * | 5/1966 | Stein | B61F 11/00 104/94 |
| 3,336,968 A | * | 8/1967 | Curtis | E05D 15/165 160/188 |
| 3,424,225 A | * | 1/1969 | Magnusson | A47H 1/104 16/95 D |
| 3,428,999 A | * | 2/1969 | Benson, Jr. | E05D 15/063 16/103 |
| 3,541,731 A | * | 11/1970 | Rossie | E05D 15/06 49/360 |
| 3,585,674 A | * | 6/1971 | Golden | A47H 13/00 16/87.6 R |
| 3,698,034 A | * | 10/1972 | Endou | A47H 1/04 16/87.4 R |
| 3,708,916 A | * | 1/1973 | Karp, Jr. | E05D 15/0613 104/105 |
| 3,757,845 A | * | 9/1973 | Pagliaro | E05D 15/262 16/87 R |
| 3,798,839 A | * | 3/1974 | Kaufman | E05D 15/0613 160/199 |
| 3,813,728 A | * | 6/1974 | Johnson | E05D 15/063 16/105 |
| 3,878,879 A | * | 4/1975 | Manns | E06B 9/62 160/133 |
| 3,946,790 A | * | 3/1976 | Besse | E05D 15/264 160/199 |
| 3,951,197 A | * | 4/1976 | Cohen | A47H 1/04 16/87.6 R |
| 4,034,439 A | * | 7/1977 | Kohne | A47H 1/04 16/96 R |
| 4,077,330 A | | 3/1978 | Peisner et al. | |
| 4,240,178 A | * | 12/1980 | Miki | A47H 15/02 16/93 D |
| 4,276,919 A | * | 7/1981 | Walters | A47K 3/362 160/199 |
| 4,408,369 A | * | 10/1983 | Labelle | E04B 2/827 16/102 |
| 4,427,049 A | * | 1/1984 | Belanger | E05D 15/264 160/199 |
| 4,432,406 A | * | 2/1984 | Belanger | E05D 15/264 160/118 |
| 4,433,627 A | * | 2/1984 | Forshee | B61B 13/04 104/95 |
| 4,619,095 A | * | 10/1986 | Johnston | E04B 2/827 49/409 |
| 4,675,939 A | * | 6/1987 | Fukada | A47H 13/01 16/102 |
| 4,785,494 A | | 11/1988 | Adamski | |
| 4,846,249 A | * | 7/1989 | Cooper | A47H 15/02 16/102 |
| 4,889,381 A | | 12/1989 | Tamblyn et al. | |
| 4,915,153 A | * | 4/1990 | Toti | A47H 1/04 160/330 |
| 4,917,021 A | * | 4/1990 | Murphy | B61D 3/182 105/225 |
| 5,025,847 A | | 6/1991 | Mueller | |
| 5,063,636 A | * | 11/1991 | Dickson | E05D 15/0613 16/106 |
| 5,085,262 A | * | 2/1992 | Tutikawa | E05D 15/26 160/199 |
| 5,123,128 A | * | 6/1992 | Hines | A47K 3/34 16/95 R |
| 5,253,694 A | | 10/1993 | Bernardo | |
| 5,377,738 A | * | 1/1995 | Cooper | E06B 9/15 160/133 |
| 5,448,855 A | * | 9/1995 | Sjoholm | E05D 15/0621 160/201 |
| 5,477,902 A | | 12/1995 | Kraeutler | |
| 5,484,007 A | | 1/1996 | Rejc | |
| 5,488,982 A | | 2/1996 | Rejc | |
| 5,657,805 A | | 8/1997 | Magro | |
| 5,839,493 A | | 11/1998 | Quasius | |
| 5,848,631 A | | 12/1998 | DeGiovanni et al. | |
| 6,082,499 A | * | 7/2000 | O'Donnell | E05D 15/12 16/87 R |
| 6,112,799 A | * | 9/2000 | Mullet | E05B 65/0021 160/201 |
| 6,260,601 B1 | | 7/2001 | Thomas | |
| 6,374,567 B1 | * | 4/2002 | Mullet | E06B 3/485 160/201 |
| 6,516,575 B2 | * | 2/2003 | Haab | E05D 13/04 160/196.1 |
| 6,540,003 B1 | * | 4/2003 | Martin | E05D 15/165 16/91 |
| 6,629,386 B1 | * | 10/2003 | Cornell | E04B 2/827 160/200 |
| 6,684,932 B2 | * | 2/2004 | Olofsson | E05D 1/02 16/225 |
| 6,745,813 B2 | * | 6/2004 | Yorgason | E05D 15/063 16/87 R |
| 6,928,696 B2 | * | 8/2005 | Wartman | E05D 15/24 16/106 |
| 7,111,661 B2 | * | 9/2006 | Laugenbach | E06B 9/13 160/133 |
| 7,121,316 B2 | * | 10/2006 | Biggers | E06B 9/0669 160/183 |
| 7,377,011 B2 | * | 5/2008 | Sakakura | A47H 13/04 16/87.2 |
| 7,699,089 B2 | * | 4/2010 | Knutson | E05F 15/605 160/196.1 |
| 7,784,520 B2 | * | 8/2010 | Paulson | E05D 15/24 16/91 |
| 8,074,699 B2 | * | 12/2011 | Jones | E05D 15/0656 160/199 |
| 8,122,933 B2 | * | 2/2012 | Rieder | E05D 15/24 104/202 |
| 8,297,333 B2 | * | 10/2012 | Meichtry | E05D 15/165 160/205 |
| 8,469,078 B2 | * | 6/2013 | Drew | E06B 9/06 16/87.4 R |
| 8,579,151 B2 | * | 11/2013 | Kodama | A45C 13/16 108/44 |
| 8,850,659 B2 | * | 10/2014 | Ewing | E05D 15/0634 16/105 |
| 8,857,015 B2 | * | 10/2014 | Hufen | E05D 15/063 16/91 |
| 9,051,774 B1 | * | 6/2015 | Acker, Jr. | E05D 15/0626 |
| 9,125,509 B2 | * | 9/2015 | Graneto, III | A47H 1/04 |
| 9,127,501 B1 | * | 9/2015 | Stobich | E06B 9/40 |
| 9,267,326 B2 | * | 2/2016 | Gomaa | E06B 9/581 |
| 2003/0141023 A1 | * | 7/2003 | Griebel | E05B 65/0021 160/180 |
| 2004/0025292 A1 | * | 2/2004 | Owens | E05D 15/0608 16/102 |
| 2005/0205221 A1 | * | 9/2005 | Miller | E06B 9/581 160/236 |
| 2007/0221341 A1 | * | 9/2007 | Schanz | E06B 9/58 160/133 |
| 2008/0196842 A1 | * | 8/2008 | Schoeren | E06B 9/86 160/133 |
| 2009/0178769 A1 | * | 7/2009 | Miller | E06B 9/581 160/133 |
| 2009/0272040 A1 | * | 11/2009 | Chen | E05D 15/165 49/420 |
| 2011/0132698 A1 | * | 6/2011 | Yu | B66B 13/30 187/333 |
| 2011/0162167 A1 | * | 7/2011 | Blais | E06B 9/52 16/91 |

(56) References Cited

U.S. PATENT DOCUMENTS

| | | | |
|---|---|---|---|
| 2012/0198655 A1* | 8/2012 | Lapping | E04H 15/18 16/91 |
| 2014/0250793 A1* | 9/2014 | Pettersson | E05D 15/063 49/414 |
| 2014/0311689 A1* | 10/2014 | Gomaa | E06B 9/70 160/270 |
| 2014/0338264 A1* | 11/2014 | Pelekanos | E05D 15/26 49/425 |
| 2015/0233163 A1* | 8/2015 | Svenson | E05D 15/26 160/113 |
| 2015/0322711 A1* | 11/2015 | Rowley | E06B 9/582 160/133 |

FOREIGN PATENT DOCUMENTS

| | | | | |
|---|---|---|---|---|
| DE | 696246 A5 * | 2/2007 | | A47H 15/02 |
| IT | 1584778 A1 * | 10/2005 | | E05D 15/165 |
| JP | 0976350 A2 * | 2/2000 | | A47H 1/04 |
| SE | 1574658 A1 * | 9/2005 | | E06B 7/23 |

* cited by examiner

CLOSURE WITH ROLLER ENDLOCK

FIELD OF THE INVENTION

This invention relates generally to closures and in particular, to a closure with a roller endlock.

BACKGROUND OF THE INVENTION

Horizontal openings often use connected slats as a covering. When opened, the interconnected slats can either roll onto a shaft or slide horizontally into a receiving space.

Access openings in warehouse, manufacturing and industrial settings are often secured by overhead (vertically traveling) closures. One popular type of overhead closure is a coiling closure, for example, slatted doors, such as rolling steel doors, which move in a generally vertical path coiling above the opening as the door is opened. Because overhead coiling closures have many fewer parts than other door types with less risk for damage and inoperability, they often make a better solution for facilities that cannot afford opening downtime.

An overhead coiling closure is either provided with a powered operator to power the door to an open or closed position or it is manually opened and closed with, for example, a looped chain or crank. A shaft is horizontally mounted above the access opening to wind or unwind the coiling closure. The coiling shaft and operator (if present) are usually covered by a hood.

Another popular type of overhead closure is a sectional overhead door. Sectional overhead doors are manufactured from horizontally hinged panels that roll into an overhead position on tracks, usually spring-assisted. Each panel of the sectional overhead door has its own connection to the door track. This increases reliability and robustness compared to monolithic doors which have only a couple of track connections for the whole panel.

A sectional overhead door may be provided with a powered operator (motor) operatively connected to a panel to power the door to an open or closed position, or it may be manually opened and closed, for example with a handle.

Horizontal doors are prone to displacement forces when objects fall upon them. Likewise, when overhead closures are installed in high traffic areas, for example, shipping and receiving areas the door can get struck by, for example, a fork lift transporting cargo and/or by the cargo being trucked by the lift. When struck, the door will bow and if the striking force is great enough the door roller will dislodge from its track. Once the door becomes damaged the closure may become non-operational with resultant access opening downtime.

Accordingly, there is still a continuing need for improved door protection designs. The present invention fulfills this need and further provides related advantages.

BRIEF SUMMARY OF THE INVENTION

In a preferred embodiment a novel door roller is presented that is more resistant to a dislodgement force. The door roller comprises a bearing that rolls on a piece of round stock that is part of a door guide. When a dislodgement force is imposed on the door, the door bows and the bearing contacts the stock preventing dislodgement of the door roller from its track and allows the door to remain operational.

One advantage of the present invention is the prevention of damage to the overhead closure obviating the need for repair or replacement.

Another advantage is the reduction in access opening downtime due to damage of the overhead closure from directed force strikes.

Yet another advantage is the ability to allow the curtain to move after being loaded and to be able to hinge on the guide at any angle the door will deflect to and still keep rolling.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 1b is a perspective view of section A of the horizontal closure of FIG. 1a.

Figure 1A:
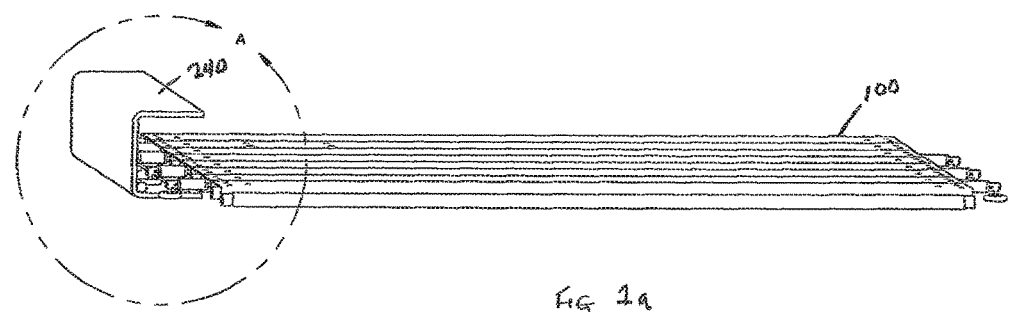
FIG. 1a is a perspective view of a horizontal closure.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

As required, detailed embodiments of the present invention are disclosed; however, it is to be understood that the disclosed embodiments are merely exemplary of the invention that may be embodied in various forms. The figures are not necessarily to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments described herein.

Figure 1B:
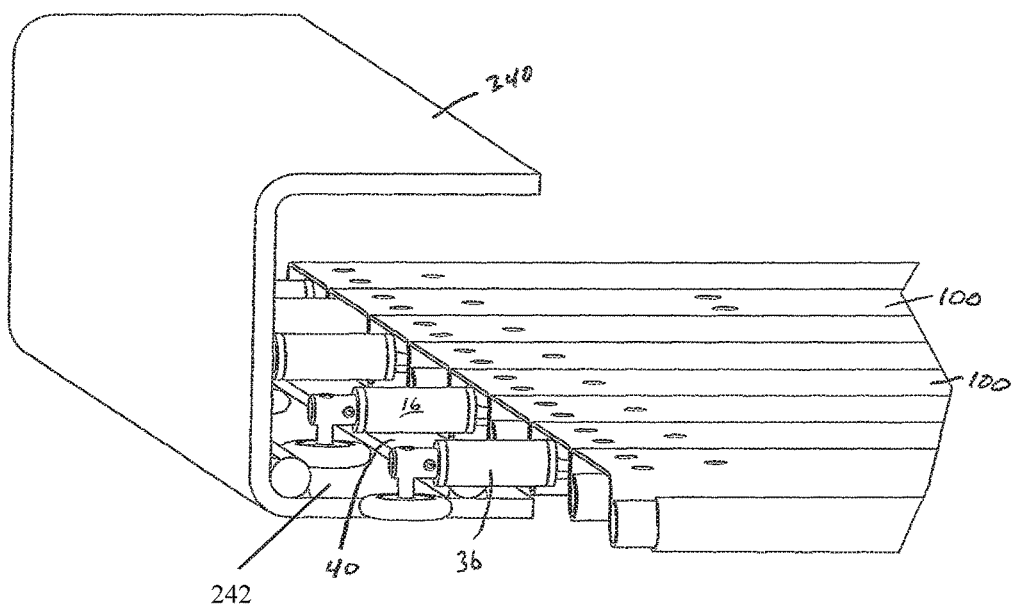

FIGS. 1a and 1b depict a horizontal closure comprising a plurality of slats 100 affixed to one another. When slid horizontally the slats 100 slide into a receiving space (not shown). To aid in clarity, a portion of the guide 240 has been cut away. At predetermined intervals along each side of the slats 100 a roller assembly 16 is mounted at a first end 18 to a slat 100, and a second end 20 comprising a retentive member, for example, a roller 22 (FIG. 4) is retentively held within guide channel 242 of guide 240. The guide 240 is fixed alongside the horizontal opening.

Figure 2:
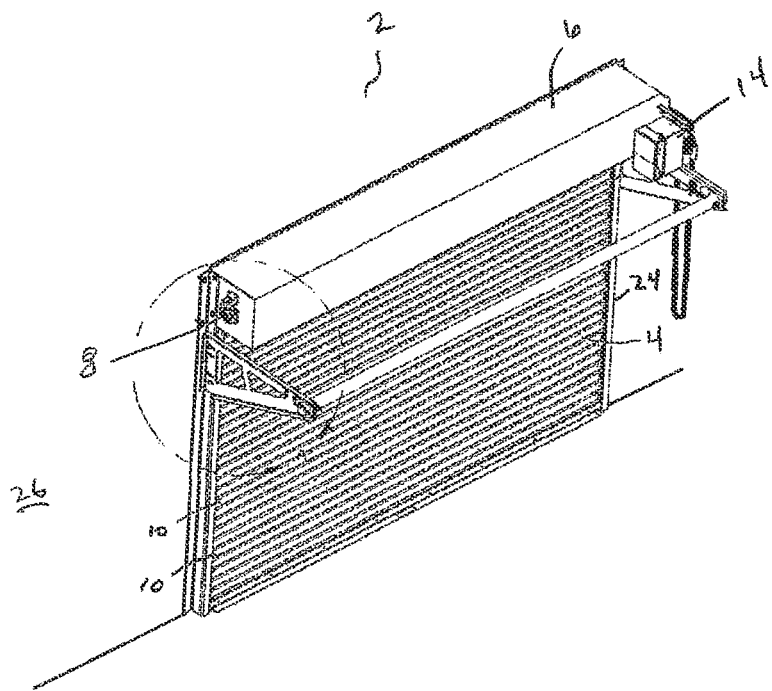
FIG. 2 is a perspective view of a coiling closure overhead door.

Turning to FIG. 2, an overhead closure 2 comprises a coiling curtain 4, wound and unwound onto a coiling shaft 8 protected by a hood 6. An operator 14 is operatively connected to and powers the coiling shaft 8. The coiling curtain 4 comprises a plurality of curtain slats 10 hingedly fixed to one another. At predetermined intervals along each side of the coiling curtain 4 the roller assembly 16 (FIGS. 4-6) is mounted at a first end 18 to the coiling curtain 4, and a second end 20 comprising a roller 22 is retentively held within a door guide 24 fixed to a wall 26.

Figure 3:
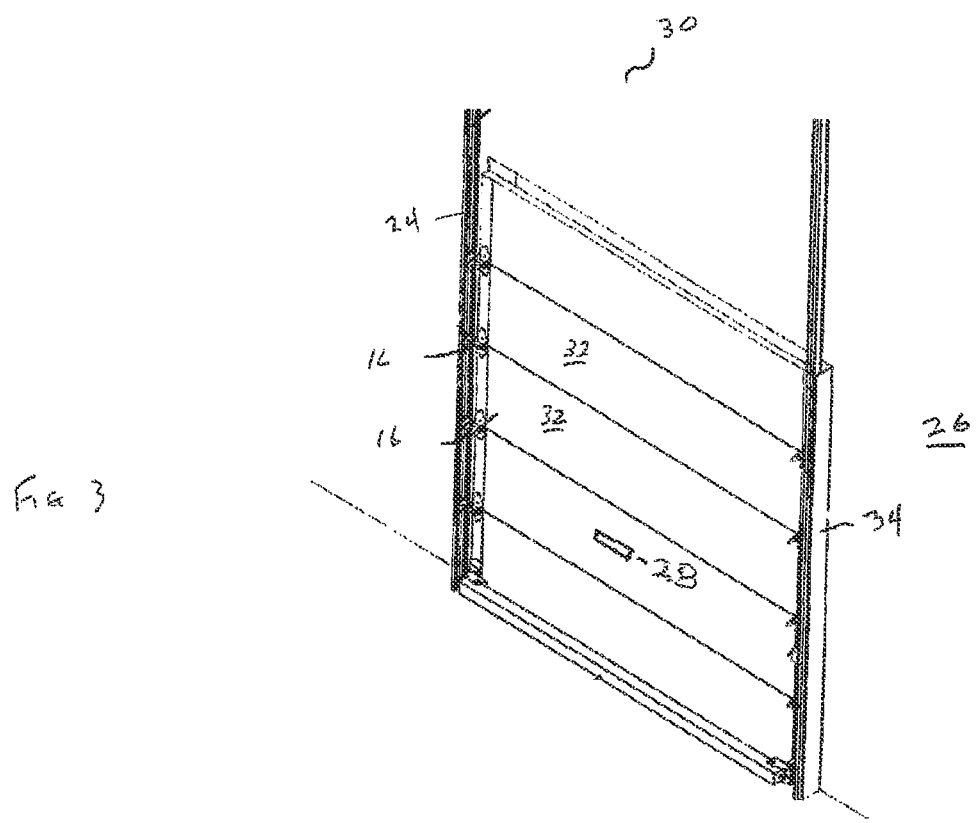
FIG. 3 is a perspective view of a sectional overhead door.

In FIG. 3 the overhead closure 2 comprises a sectional overhead door 30 comprising a plurality of hingably connected door panels 32 having at each panel end a mounted roller assembly 16 hingably mounted at a first end 18 to contiguous panels; a second end 20 comprises a roller 22 that is retentively held within the door guide 24, for example a track, fixed to a wall 26. Handle 28 aids in opening and closing the door. Optionally a motor (not shown) may be operatively connected to the door panels 32 to provide powered operation. Optional track guard 34 may be used to protect the track.

The embodiments shown in FIGS. 1-3 all utilize the novel roller assembly 16 depicted in the exemplars shown in FIGS. 4-9. The roller assembly 16 is more resistant to a dislodgement force such as snow, wind, or water pressures than known designs, thereby allowing the curtain to both continue operation after being force loaded and to be able to hinge on the guide at any angle the door will deflect to and still keep rolling.

Figure 4:
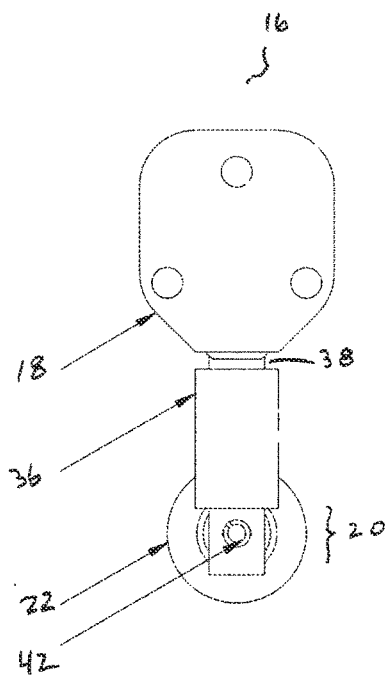
FIG. 4 is a top view of a roller assembly.
Figure 5:
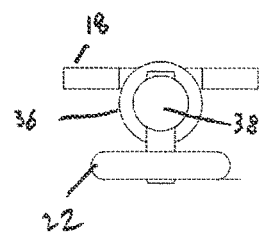
FIG. 5 is an end view of a roller assembly.
Figure 6:
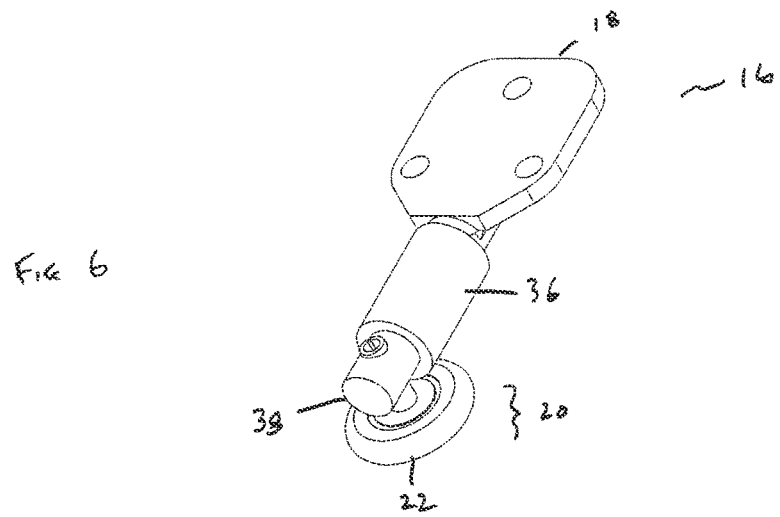
FIG. 6 is a perspective view of one form of a roller assembly.

In addition to the roller assembly features described above, the door roller assembly 16 further comprises a roller assembly support member positioned on a shaft between the roller assembly first and second ends 18, 20. The roller assembly support member may be, for example, a long bearing or sleeve bearing 36, preferably a free floating bearing (FIGS. 4-6). When used with, for example, the horizontal closure of FIG. 1, preferably roller 22 is offset from shaft 38 with an offset member 42, for example, a spring pin. Returning to FIG. 1b, the long bearing 36 is positioned to roll on a roller assembly support receiving member 40, for example, a piece of stock offset from the door guide 240.

In all embodiments, when a dislodgement force is imposed on the closure, the slats 100 (FIGS. 1a and 1b), curtain 4 (FIG. 2), or panels 32 (FIG. 3) bow and the long bearing 36 contacts the long bearing support receiving member 40 preventing dislodgement of the roller assembly 16 from its guide 240, 24, thereby keeping the closure operational. The roller assembly support receiving member 40 is preferably round stock to allow the door to deflect a wide range of angles while still providing retention of the roller assembly 16 within the guide 240, 24.

Figure 7:
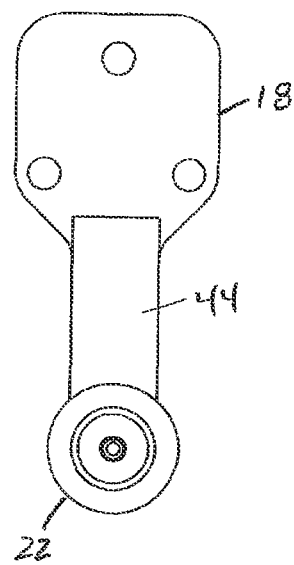
FIGS. 7-9 are views of a second form of a roller assembly.
Figure 8:
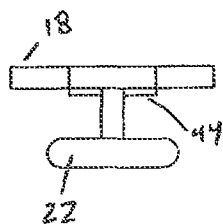
Figure 9:
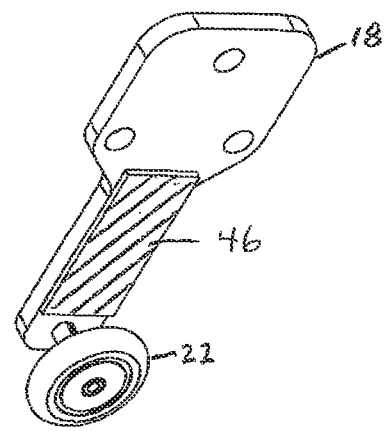

Alternatively, depicted in FIGS. 7-9, rather than a long bearing, the roller assembly support member may be, for example, a plate 44 upon which may optionally be fixed a material 46 having a low coefficient of friction, for example, PTFE, allowing the plate 44 to freely slide against the roller assembly support receiving member 40.

At least one roller assembly, preferably all roller assemblies, include a roller assembly support member.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:
1. A closure comprising:
a door; and
a plurality of roller assemblies, each roller assembly having a first end attached to the door, a second end comprising a retentive member retentively held within a door guide; and a first shaft between the first end and second end, the retentive member in a non-movable location relative to the first shaft;
wherein the door guide comprises
a door guide channel located in a plane normal to a plane of the first shaft, and
a roller assembly support receiving member offset from the first shaft; and
at least one roller assembly of the plurality of roller assemblies further comprises a single roller assembly support member positioned inline between the roller assembly first end and the roller assembly second end;
wherein the retentive member engages the roller assembly support receiving member and the door remains operable when deflected.

2. The closure of claim 1 wherein the door is a coiling curtain and the closure further comprises an operator operatively connected to a coiling shaft upon which the coiling curtain winds and unwinds.

3. The closure of claim 1 wherein the door is a horizontally sliding plurality of slats affixed to one another.

4. The closure of claim 1 wherein the roller assembly support member comprises
a long bearing positioned on the first shaft.

5. The closure of claim 4 wherein the roller assembly support member is free floating.

6. The closure of claim 1 wherein the door comprises a sectional overhead door comprising a plurality of hingably connected door panels having at a panel end a roller assembly hingably mounted at the first end to a contiguous panel.

7. The closure of claim 1 wherein the roller assembly support member comprises a plate.

8. The closure of claim 7 further comprising a material affixed to the plate, the material having a coefficient of friction allowing the plate to effectively freely slide against the roller assembly support receiving member.

9. The closure of claim 1 wherein the roller assembly support receiving member comprises round stock.

10. A closure comprising:
a coiling curtain;
an operator operatively connected to a coiling shaft upon which the coiling curtain winds and unwinds; and
a plurality of roller assemblies, each roller assembly having a first end attached to the door, a second end comprising a retentive member retentively held within a door guide, and a second shaft between the first end and second end;
wherein the door guide comprises
a door guide channel located in a plane normal to a plane of the second shaft, and
a roller assembly support receiving member offset from the second shaft; and
at least one roller assembly of the plurality of roller assemblies further comprises a single long bearing positioned on the second shaft and inline between the roller assembly first end and the roller assembly second end to contact the offset roller assembly support receiving member.

11. The closure of claim 10 wherein the long bearing is free floating.

12. The closure of claim 10 wherein an offset member offsets the second end from the second shaft.

13. The closure of claim 10 wherein the roller assembly second end is a roller.

14. The closure of claim 10 wherein the offset roller assembly support receiving member comprises round stock.

* * * * *